United States Patent [19]

Vancoppenolle et al.

[11] Patent Number: 5,028,691

[45] Date of Patent: Jul. 2, 1991

[54] PROCESS OF COOLING A HEATED POLYETHYLENE TEREPHTHALATE FILM

[75] Inventors: Gery Vancoppenolle, Weerde; Jan K. De Keyzer, Schilde; Walter J. Rens, Hove, all of Belgium

[73] Assignee: Agfa Gevaert, N.V., Mortsel, Belgium

[21] Appl. No.: 535,584

[22] Filed: Jun. 11, 1990

[30] Foreign Application Priority Data

Jun. 12, 1989 [EP] European Pat. Off. ........ 89201499.4

[51] Int. Cl.$^5$ ................................................ C08F 6/00
[52] U.S. Cl. .................................... 528/503; 264/557; 264/562; 264/289.6
[58] Field of Search ................ 528/503; 264/557, 562, 264/289.6; 427/55

[56] References Cited

U.S. PATENT DOCUMENTS 4,293,508 10/1981 Heirbaut et al. ................ 264/289.6

Primary Examiner—Paul R. Michl
Assistant Examiner—Yong S. Lee
Attorney, Agent, or Firm—William J. Daniel

[57] ABSTRACT

A process of cooling a heated polyethylene terephthalate film by applying cooling liquid to both surfaces of the heated film and, after the temperature of the film has decreased sufficiently, removing the cooling liquid from the film, wherein the cooling liquid has a pH value between 6 and 3.

7 Claims, 2 Drawing Sheets

PROCESS OF COOLING A HEATED POLYETHYLENE TEREPHTHALATE FILM

BACKGROUND OF THE INVENTION

1. Field of the Invention

The present invention relates to a process of cooling a heated polymer film by conveying the film through a body of cooling liquid and next removing cooling liquid that remains adherent to the film after the film has left the cooling liquid body. The invention relates in particular to a process of longitudinally stretching a molecularly orientable polyethylene terephthalate film.

2. Description of the Prior Art

In the extrusion process of making polymer film, the molten polymer is extruded through a slot-like orifice and the extruded polymer is received on a quenching drum on which the temperature of the extruded film is lowered sufficiently rapidly through the softening range of the polymer to obtain a substantially amorphous film. By stretching the quenched film longitudinally and transversely while the film is at the lower end of the softening range, above the second order transition temperature of the polymer, the film can be subjected to molecular orientation leading to an improvement in various physical properties of the film, notably the tensile strength.

The longitudinal stretching of the film is usually achieved by passing the film first around a series of slowly rotating hold back rollers and then around a series of rollers which are rotated more rapidly, and by heating the film between the two series of rollers to a temperature such that the film undergoes plastic elongation under the traction forces imposed on it due to the different speeds of the two series of rollers.

The cooling of the film after stretching is effected by cooling the more rapidly rotating rollers to a temperature well below the second order transition temperature of the film. The described steps of heating cooling and stretching a film are disclosed in U.S. Pat. No. 4,093,695 relating to a process for making polymeric film.

This process shows certain disadvantages the most important of which are as follows.

The stretching span, that is the length of the film path over which the stretching occurs, is rather long and in consequence there is appreciable "necking-in" of the film which causes beaded edges of the film.

Further, the alternating contact of the film with the different cooling rollers causes curving stresses in the film which produce a non-uniform heat transfer across the width of the film.

Finally, there is a deterioration in the surface quality of the film owing to the contact of the film with traction rollers while the film is under stretching forces.

There has been provided an improved longitudinal stretching process which considerably reduces the disadvantages mentioned hereinbefore. This process comprises preheating the film for causing the film temperature to increase, but insufficiently high for plastic film elongation to occur, then stretch-heating the film to a temperature at which instant plastic elongation occurs under the stretching forces, and finally very rapidly cooling the film by immersing the film in a bath of cooling water. This process is disclosed in EU B1 0 022 278.

While this process enables to overcome satisfactorily the mentioned difficulties, it shows in practice the disadvantage that the production speed is limited because above a certain film speed, it becomes difficult to satisfactorily remove the cooling water from the film.

As a matter of fact, it has been shown that the removal of cooling water by passing the film over successive squeeze rollers does not lead to a complete removal of the water, and that the removal of the rest water that adheres to the film in the form of isolated droplets or islands of liquid, by means of air knives or the like, is very difficult, not if impossible. The removal of cooling water from the film by squeeze means in the form of rubber bars does not produce better results. The removal of the cooling water by means of air knives produces slightly better results but still leads to production speeds which are limited in practice to approximately 50 m.min$-1$. It is of course possible to remove remaining water from the film by drying, but this is not desirable in practice since this step requires a large amount of energy. Moreover, the drying of the film causes drying stains on the film surface which form a problem in case the film will be used as a photographic support that will bear a transparent image.

SUMMARY OF THE INVENTION

Object of the Invention

It is an object of the invention to provide an improved process of cooling a heated polyethylene terephthalate film by the application of a cooling liquid to the film, wherein the removal of liquid from the cooled film can proceed easier and at higher film speeds than with the prior art processes.

Statement of the Invention

According to the present invention, a process of cooling a heated polyethylene terephthalate film by applying cooling liquid to both surfaces of the heated film and, after the temperature of the film has decreased sufficiently, removing the cooling liquid from the film, is characterized by keeping the degree of acidity of the cooling liquid to a value which corresponds with a pH comprised between 6 and 3.

The wetting of a film with a liquid with a pH comprised in the mentioned range, conducts to an easier i.e. a quicker and a completer freeing of the film from liquid, as has been found.

The application of the cooling liquid to the film occurs in a suitable way by passing the film through a body of liquid contained in an open tank. A preferred cooling liquid is water.

According to a suitable embodiment of the process according to the invention, the removal of the cooling liquid from the film is done by conveying the film straight upwardly over a distance that is sufficiently long for liquid peaks to form on either film side.

The term "liquid peak" stands in the present description for a layer of liquid on a film surface that has the shape of an elongated equilateral triangle the base of the triangle being close to the place where the application of liquid to the film is stopped such as the free surface of the liquid in an open tank through which the film is passed, and the top of the triangle being located at a height that may range between some decimeters and some meters above the base. The triangular shape of the liquid peak is a geometric form that establishes itself as a consequence of a dynamic equilibrium between the viscosity and the surface tension of the cooling liquid and the speed of the film.

The peripheral edges of the included sides of the triangle forms virtually a boundary between the wet and the dry film surfaces. Yet there may be small amounts of residual liquid that do not remain within the liquid peak but that may become carried along by the film at the central region of the film, usually in the form of isolated droplets. This phenomenon occurs in particular at higher film speeds.

According to a suitable embodiment of the invention, such residual liquid is removed from the film by means of blasts of pressurized air which urge said residual liquid downwardly, preferably into contact with the top of a liquid peak.

A satisfactory position for said air blasts is just downstream, i.e. according to the direction of, or alone, movement of the film, of the top of a liquid peak.

Practice shows that at increasing film speeds, the height of a liquid peak may become important and the higher a liquid peak, the smaller will be its top angle and concomitantly therewith the less becomes the height stability of its top, as practice shows. This means that it becomes difficult to accurately position the airblasts, since if they are too far downstream of the expected position of the top of a liquid peak their effect is unsatisfactory, whereas if they are too close they may get an upstream position or behavior, relative to the top of the liquid peak, what may cause the splitting or the rupturing of the liquid peak and consequently the end of the complete liquid removal.

Therefore, according to a further embodiment of the invention, the length of the liquid peaks is reduced by deliberately splitting the liquid peak into two or more sub-peaks. This may be achieved according to one embodiment of the invention, by directing an air jet on the surface of a liquid peak, at a location near the beginning of its upward course, whereby the integrity of the liquid layer is broken and instead two sub-peaks are initiated.

It has been found that under certain conditions of operation a liquid peak is not formed spontaneously on the film as the film is conducted upwardly, but instead the adherent liquid layer starts to contract laterally only after some decimeters of upward travel of the film. According to an interesting embodiment of the process according to the invention, the initiation of the liquid peaks on both film surfaces is improved by the application of forces that urge the side edges of the adherent liquid layers invariably towards each other. Such forces may be established by blasts of pressurized air next to the film edges that strike along the film surfaces and are directed towards the centre of the film.

The invention is particularly important in connection with the longitudinal stretching of a substantially amorphous polyethylene terephthalate film which is rapidly cooled after the stretching by conveyance into a bath of cooling liquid and therefore the examples which will be described hereinafter relate to the production of such film. However, the process according to the invention is also applicable in the cooling of a heated polyethylene terephtalate film in other situations, such as the quenching of the film as the film leaves in molten state an extrusion die and must be rapidly cooled to keep it in a substantially amorphous state.

BRIEF DESCRIPTION OF THE DRAWINGS

The invention will be described hereinafter by way of example with reference to the accompanying drawings, wherein.

Figure 1:
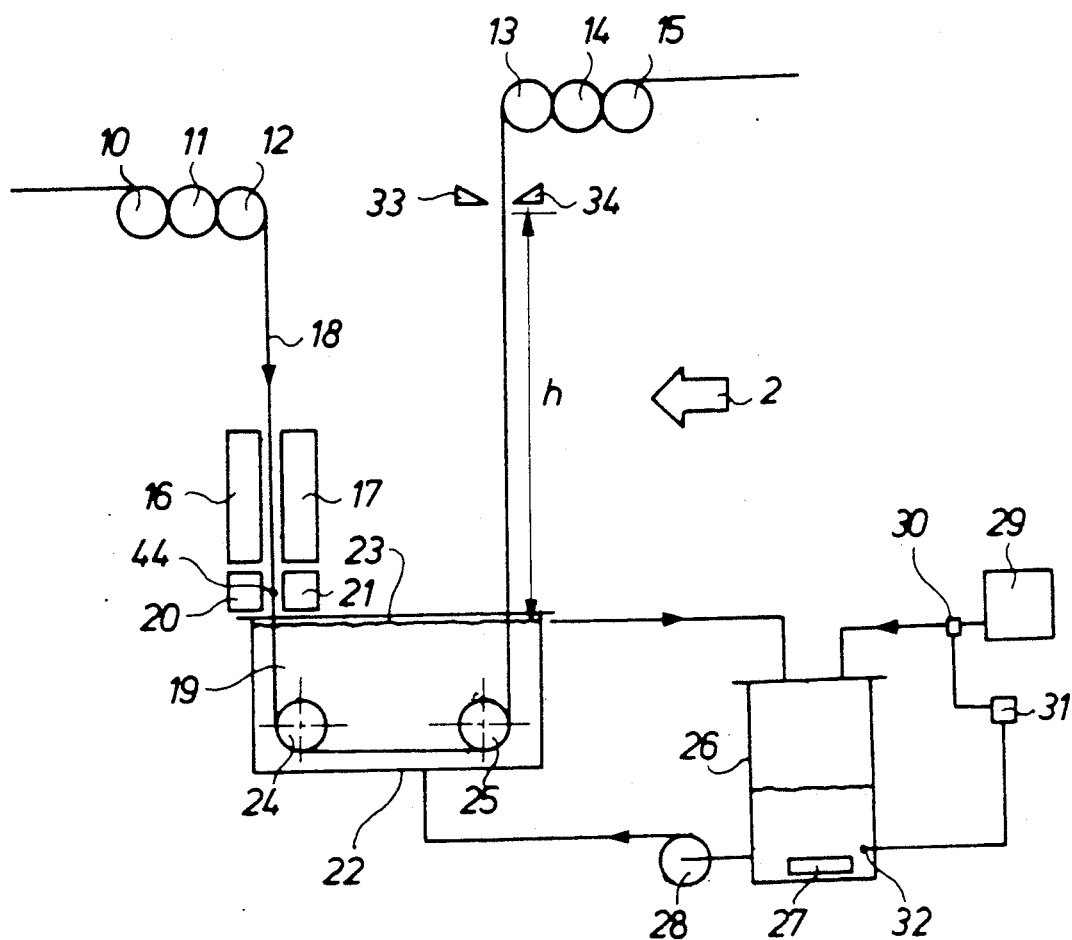
FIG. 1 is a diagrammatic view of one embodiment of an apparatus for longitudinally stretching and subsequent cooling a film in accordance with the process according to the invention.

Referring to the embodiment illustrated in FIG. 1, an apparatus for longitudinally stretching a polyethylene terephthalate film comprises a series of three rollers 10, 11, and 12 driven by suitable means known in the art at a first speed $v_i$, and three rollers 13, 14, and 15 driven at a second speed $v_o$, the quotient of $v_o$ by $v_i$ determining the stretch ratio of the film.

The rollers 10 to 15 may be steel rollers having a highly polished mirrorlike surface finish as known in the art.

The function of the two series of rollers is to produce in the film web portion that extends between them, a longitudinal tensioning force that is suited for the longitudinal stretching of the film as the film has been heated to the stretching temperature.

The rollers have no proper thermal function in the present film stretching process. This means that in principle the temperature of the rollers is equal to the temperature of the film entering into contact with them. It should be understood, however, that in practice small differences may exist between the temperature of the film and a roller contacted thereby.

The preheating of the film occurs by first IR-heaters 16 and 17 located symmetrically at either side of the path of the film 18. The heating of the film to the stretching temperature occurs by second IR-heaters 20 and 21 located likewise symmetrically at either side of the path of the film.

The cooling of the stretched film occurs by conveying the film into a body of cooling water 19 contained in an open tank 22. The level of the liquid is indicated by the line 23.

The guidance of the film through the cooling tank occurs by freely rotatable rollers 24 and 25 immersed in the cooling liquid.

The cooling water in the tank 22 is kept at a constant level by means known in the art, and liquid that is withdrawn from the tank by the film is replaced by liquid from a supply 26 by a pump 28 that also maintains a continuous circulation of liquid between the tank 22 and the supply 26. A heat-exchanger 27 permits to control the temperature of the circulating liquid to the desired value.

Further details about the illustrated apparatus for longitudinally stretching, and cooling a polyethylene terephthalate film by conveying it through a bath with cooling water, may be found in EU B1 0 022 278 referred to in the introduction of this specification.

The cooled film leaves the cooling tank straight upwardly, towards the first roller 13 of the rapidly rotating stretching rollers 13, 14 and 15.

The film that leaves the tank 22 in the direction of the roller 13 shows on each surface a water peak 35 with a height h. The term "waterpeak" stands for an uninterrupted layer of water that is in adherent contact with the filmsurface and the base 36 of which has a width equal to that of the film and coincides practically with the water level 23, see FIG. 2 which is a partial view of FIG. 1 according to the arrow 2. The top 37 of the water peak is situated at a height h above the base and is slightly rounded, with a radius that is difficult to measure but that is estimated to range between one and a few centimeters.

The free surface of the waterpeak is not quiescent in operation but bears a plurality of strand-like rivulets that run straight downwardly and that continuously undergo slight lateral displacements on oscillation.

These downwardly flowing rivulets of water, together with the less plainly noticeable more quiescent water layer between them, are in equilibrium with the amount of water that is removed by the film from the bath per unit of time.

The inclined peripheral edges of the water peak are remarkably stable and forms a clear boundary between the wet and the dry surface of the film, except for the top 37 of the water peak where one observes that as the film speed increases, there is an increasing amount of water droplets that become detached from the water peak and are carried along with the film. This phenomenon extends over a width of several centimeters depending on the type of film, the top angle of the water peak, and the speed of the film.

The water droplets that are detached from the top of the water peak and carried along by the film are removed from the film by air blasts from nozzles 33 and 34 that blow any residual water back into contact with the top of the water peaks whereby said water is carried off towards the bath 19.

In operation of the arrangement, it has been found that the higher the film speed, the larger becomes h whereby the top angle of the water peak decreases and the stability of the position of said top, considered according to the longitudinal direction of the film, decreases correspondingly so that the effect of the air blasts produced by the nozzles 33 and 34 may become doubtful and the satisfactory water removal from the film becomes impeded.

According to the method of the present invention, the magnitude of h is reduced by keeping the acidity of the cooling water at a value which corresponds with a pH comprised between 6 and 3.

This is achieved in the illustrated arrangement by the provision of a supply vessel 29 that contains an acid, e.g. acetic acid, that may be fed to the water in the supply vessel 26 via a valve 30 under the control of a controller 31 which is responsive to a sensor 32 which measures the degree of acidity of the cooling water.

It is clear that in operation of the arrangement, cooling water will be continuously removed from the circuit comprising the tank 22 and the vessel 26. This removed water is replaced from an external source (not illustrated) that communicates with the vessel 26, and the acidity control operates in response to the supply of fresh water.

In operation of the device, it has been found that at increasing film speeds the establishing of the water peaks may become uncertain, in a sense that the base 36 may become displaced upwardly up to a level as indicated by way of example by the broken line 40, so that the water peak becomes correspondingly higher located and the top 37 may get a position beyond the nozzle 34.

Although a re-adjustment of the nozzle may avoid the problem, the operation of the installation remains critical since the level 40 at which the base of the water peak is formed is unstable so that the position of the water peak varies, and so does the top 37 with respect to the nozzle 34.

Figure 2:
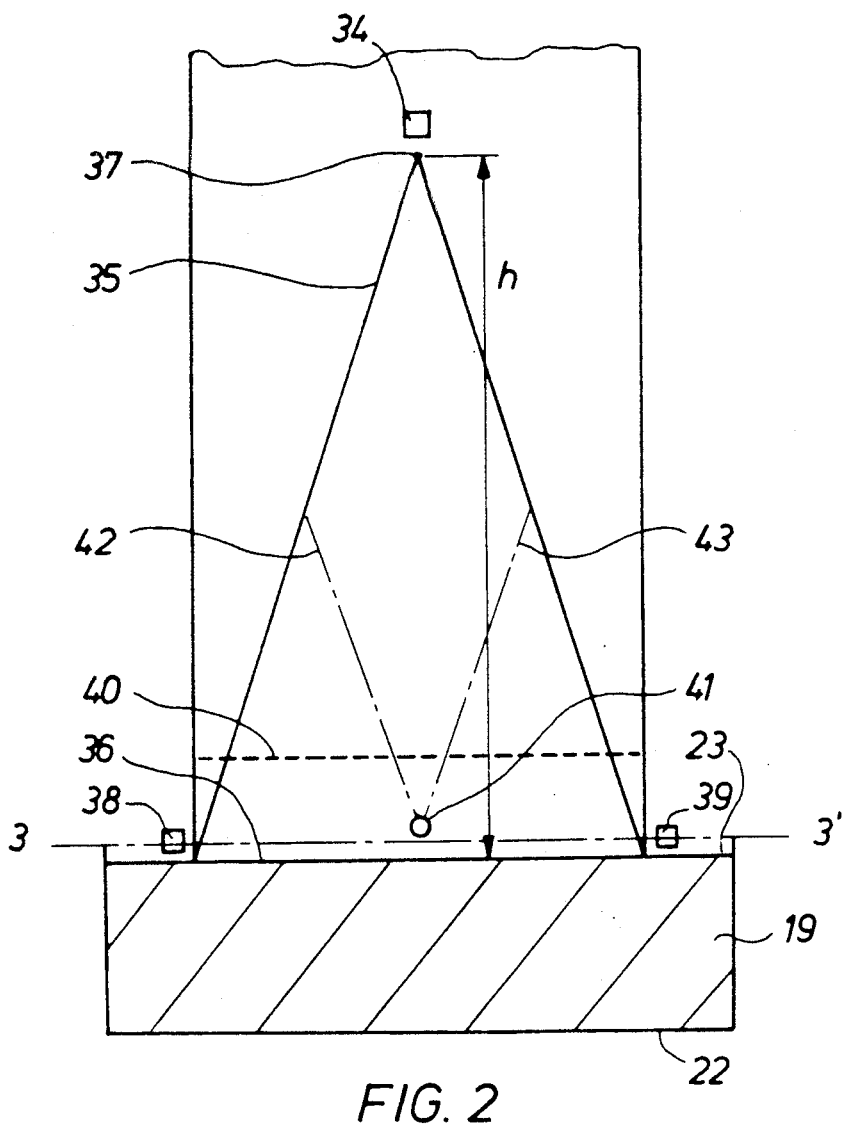
FIG. 2 is a view according to the arrow 2 of FIG. 1.
Figure 3:
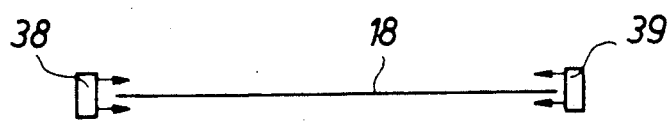
FIG. 3 is a horizontal sectional view on line 3—3' of FIG. 2.

Therefore, it is important to take measures to promote the initiation of the water peaks. Such measures comprise the use of air blasts produced by nozzles 38 and 39 that are placed near the edges of the film, as shown in FIG. 2, and in FIG. 3 which is a horizontal sectional view of FIG. 2 on line 3—3'.

The nozzles 38 and 39 each have a horizontal slotlike opening with a length of approximately 2 cm, and they produce air blasts located in a horizontal plane that strike along both surfaces of the film and that urge the edges of the layers of water that adhere at both surfaces of the film, towards each other, i.e towards the center of the film whereby the triangular shape of the adherant water layer is instantly initiated. A suitable position for the nozzles 38 and 39 is from one to approximately five centimeters above the level 23 of the water 19.

The improvement which may be obtained by means of the process according to the present invention, is illustrated by the following examples, example 1 illustrating the operation of the device of FIG. 1 according to the process of the present invention, and example 2 relating to the operation of this device in accordance with the art.

EXAMPLE 1

A polyethylene terephthalate polymer having an inherent viscosity of 0.57 dl.g$^{-1}$ was extruded at a temperature of 290° C. by an extrusion die having a film forming orifice. The molten polymer was received on quenching drums which caused a film temperature of 37.0° C. as the film left the last quenching drum, and the amorphous film had a crystallinity of 0.4%. The film was fed to the rollers 10, 11, 12, which were maintained at a surface temperature of approximately 40° C. The film thickness amounted to 1100 mm.

The first set of IR-heaters 16 and 17 each comprised 10 parallelly spaced IR-lamps of the type "middle-wavelength", consuming each an electrical power of 50 watts/linear cm. The maximum of the emission spectrum of the lamps was situated at a wavelength of approximately 2.3 um (micrometer). The length of the heaters 16 and 17, measured parallel with the direction of film movement, amounted to 25 cm. The temperature of the film leaving the heaters 16 and 17 mounted to 79° C.

The second set of IR-heaters 20 to 21 each comprised IR-lamps of the type "short-wavelength" and consuming each a power of 80 Watts/linear cm. The maximum of the emission spectrum of the lamps was situated at 1.2 um. The distance between the tine 44 onto which the radiant energy was focussed on the film, and the Level 23 of the cooling liquid, amounted to 20 mm.

The stretch ratio of the film was set to 1:3.4 by using a corresponding speed difference between the rollers 13, 14, 15 and 10, 11, 12. The corresponding stretch rate amounted to 200,000% min$^{-1}$.

The stretched film was pulled through the cooling station 22 that contained demineralized water as a cooling medium. The water was kept at a temperature of 20° C. by means of the heat-exchanger 27, and the acidity of the water was adjusted to a pH=4.0.

The nozzles 33 and 34 had a horizontal opening measuring 0.5×0.5 mm, and were tilted downwardly over an angle of 75° with respect to the horizontal. The air pressure at the nozzles was 4 bar.

The air pressure at nozzles 38 and 39 was 4 bar.

It was shown that the speed v of the stretched film could be increased up to 70 m.min$^{-1}$ before the water was no longer completely removed from the film by the nozzles 33 and 34. The height of the water peak on both film surfaces amounted at that moment to h=4.0 m.

It should be understood that the air flow pressure and the rate of the air of the nozzles 33, 34 cannot be increased indefinitely in order yet to blow off residual liquid from the film surface beyond the top of the water-peaks, since this may put the film in undesired vibration, requires much energy, and produces a noise level that is no longer acceptable for an unprotected operator.

EXAMPLE 2

The stretching operation was repeated, except for the acidity of the cooling water which was made neutral, i.e. a pH=7, by the replacement of all the water of the circuit by fresh water.

The stretching conditions being not changed, it was shown that the speed v of the stretched film could only be increased up to 47.0 m.min$^{-1}$ before the water was no longer completely removed from the film by the air knives 33 and 34. The height h amounted to 4.0 m.

The above examples illustrate that in the present case, the process according to the invention enabled to obtain a gain in production speed of almost 49%.

The invention is neither limited to the described example, nor to the illustrated embodiment.

The height of the water peaks may be reduced by splitting up each peak in two or more sub-peaks. This measure has been illustrated diagrammatically in FIG. 2, where an extra nozzle 41 produces an air blast that divides the water peak into two halves of almost equal width what results in two sub-peaks 42 and 43. Corresponding air nozzles must be provided just downstream of the top of such sub-peaks for operation in accordance with the nozzle 34 for the peak 35.

The improved removal of liquid from the film in accordance with the present invention is not necessarily based on the formation of liquid peaks that flow down the film by gravity, since the operation of common liquid removing arrangements including rollers, scrapers, air knives and the like becomes more effective as well by the use of a cooling liquid with an acidity between 6 and 3. However, the removal of adherent liquid from the film, integrally along a transverse line of a film, remains difficult since residual liquid which still will remain is very difficult to remove.

The rotatable journalling of the rollers 24 and 25 in the cooling tank 22 may raise problems as a consequence of the use of an acid cooling liquid. Therefore it may be desirable to locate the bearings of the rollers outside of the tank, and to seal the passage of the roller shafts through the lateral tank walls by appropriate rotational sealings.

We claim:

1. A process of cooling a heated polyethylene terephthalate film by applying cooling liquid to both surfaces of the heated film and, after the temperature of the film has decreased sufficiently, removing the cooling liquid from the film, characterized by keeping the degree of acidity of the cooling liquid at a value which corresponds with a pH comprised between 6 and 3.

2. A process according to claim 1, wherein the cooling liquid is water.

3. A process according to claim 1, wherein the removal of the cooling liquid from the film is done by conveying the film straight upwardly over a distance that is sufficiently long for liquid peaks to form on either film side.

4. A process according to claim 3, wherein rest liquid that remains adherent to the film downstream, i.e. according to the direction of movement of the film, of the tops of the liquid peaks is removed by means of blasts of pressurized air.

5. A process according to claim 3, wherein the removal of the rest liquid is done in such a way that such liquid enters into contact with the liquid contained in the top of a liquid peak.

6. A process according to claim 3, comprising promoting the formation of liquid peaks on the upwardly moving film by urging the edges of the liquid layers that adhere to either film surface, towards the center of the film.

7. A process according to claim 1, wherein the film is heated to a temperature above its second order transition temperature in order to longitudinally stretch the film.

* * * * *

UNITED STATES PATENT AND TRADEMARK OFFICE
CERTIFICATE OF CORRECTION

PATENT NO. : 5,028,691

DATED : July 2, 1991

INVENTOR(S) : Gery Vancoppenolle et al

It is certified that error appears in the above-identified patent and that said Letters Patent is hereby corrected as shown below:

Col. 8, Claim 1, lines 5 and 6, cancel "by keeping the degree of acidity of the" and insert in lieu thereof --in that said--.

lines 6 and 7, cancel "at a value which corresponds with" and insert in lieu thereof --has--.

Col. 8, Claim 2, line 2, before "water", insert --acidified--.

Col. 8, Claim 3, lines 1 and 2, cancel "the removal of".

line 2, after "liquid", insert --is removed-- and after "film", cancel "is done".

Col. 8, Claim 4, line 1, change "rest" to --residual--.

Col 8, Claim 5, lines 1 and 2, cancel "the removal of" and before "liquid", insert --residual--.

lines 2 and 3, cancel "done in such a way that such liquid enters" and insert in lieu thereof --removed by urging the same--.

line 4, change "a" to --an adjacent--.

UNITED STATES PATENT AND TRADEMARK OFFICE
CERTIFICATE OF CORRECTION

PATENT NO. : 5,028,691

DATED : July 2, 1991

INVENTOR(S) : Gery Vancoppenolle et al

It is certified that error appears in the above-identified patent and that said Letters Patent is hereby corrected as shown below:

Col. 8, Claim 7, line 3, cancel "in order to" and insert in lieu thereof --while being stretched to--.

lines 3 and 4, cancek "stretch the film" and insert in lieu thereof --stretching before being cooled--.

Signed and Sealed this

Twenty-second Day of December, 1992

Attest:

DOUGLAS B. COMER

Attesting Officer      Acting Commissioner of Patents and Trademarks